United States Patent
Yang et al.

(10) Patent No.: US 10,700,346 B2
(45) Date of Patent: Jun. 30, 2020

(54) NEGATIVE ELECTRODE AND METHOD FOR MANUFACTURING SAME

(71) Applicant: LG Chem, Ltd., Seoul (KR)

(72) Inventors: Jin Ho Yang, Daejeon (KR); Song Taek Oh, Daejeon (KR); Young Geun Choi, Daejeon (KR)

(73) Assignee: LG Chem, Ltd. (KR)

(*) Notice: Subject to any disclaimer, the term of this patent is extended or adjusted under 35 U.S.C. 154(b) by 206 days.

(21) Appl. No.: 15/750,057

(22) PCT Filed: Mar. 24, 2017

(86) PCT No.: PCT/KR2017/003221
§ 371 (c)(1),
(2) Date: Feb. 2, 2018

(87) PCT Pub. No.: WO2017/164702
PCT Pub. Date: Sep. 28, 2017

(65) Prior Publication Data
US 2018/0226641 A1    Aug. 9, 2018

(30) Foreign Application Priority Data

Mar. 24, 2016 (KR) ........................ 10-2016-0035120

(51) Int. Cl.
*H01M 4/36* (2006.01)
*H01M 4/04* (2006.01)
(Continued)

(52) U.S. Cl.
CPC ............. *H01M 4/366* (2013.01); *B60L 50/50* (2019.02); *H01M 4/0404* (2013.01);
(Continued)

(58) Field of Classification Search
CPC .. H01M 4/0428; H01M 4/1395; H01M 4/366; H01M 4/386
(Continued)

(56) References Cited

U.S. PATENT DOCUMENTS

2004/0113542 A1  6/2004  Hsiao et al.
2004/0142242 A1  7/2004  Kawase et al.
(Continued)

FOREIGN PATENT DOCUMENTS

CN  1870327 A  11/2006
CN  103733388 A  4/2014
(Continued)

OTHER PUBLICATIONS

Martyniuk et al. Determination of residual stress in low-temperature PECVD silicon nitride thin films. Proc. SPIE vol. 5276, 2004, pp. 451-462. Retrieved online from: <URL: https://doi.org/10.1117/12.523327> (Year: 2004).*

(Continued)

*Primary Examiner* — James M Erwin
(74) *Attorney, Agent, or Firm* — Lerner, David, Littenberg, Krumholz & Mentlik, LLP

(57) ABSTRACT

The present invention relates to a negative electrode and a method for manufacturing the same. Specifically, the present invention provides a negative electrode comprising a current collector, a first active material layer formed on the current collector, and a second active material layer formed on the first active material layer, wherein the first active material layer comprises carbon-based negative electrode active material particles, and the second active material layer comprises silicon nitride. The negative electrode according to the present invention comprises a second active material (Continued)

Example 1

Comparative Example 1 layer comprising silicon nitride on a first active material layer. Nitrogen of the silicon nitride may react with lithium ions to form lithium nitride.

16 Claims, 1 Drawing Sheet

(51) Int. Cl.
| | |
|---|---|
| *H01M 4/38* | (2006.01) |
| *H01M 4/134* | (2010.01) |
| *H01M 4/62* | (2006.01) |
| *H01M 4/133* | (2010.01) |
| *H01M 4/1393* | (2010.01) |
| *H01M 4/587* | (2010.01) |
| *H01M 4/1395* | (2010.01) |
| *B60L 50/50* | (2019.01) |
| *H01M 4/583* | (2010.01) |
| *H01M 10/0525* | (2010.01) |
| *H01M 4/02* | (2006.01) |
| *H01M 10/052* | (2010.01) |

(52) U.S. Cl.
CPC ......... *H01M 4/0428* (2013.01); *H01M 4/133* (2013.01); *H01M 4/134* (2013.01); *H01M 4/1393* (2013.01); *H01M 4/1395* (2013.01); *H01M 4/386* (2013.01); *H01M 4/583* (2013.01); *H01M 4/587* (2013.01); *H01M 4/62* (2013.01); *H01M 4/623* (2013.01); *H01M 10/0525* (2013.01); *H01M 10/052* (2013.01); *H01M 2004/021* (2013.01); *H01M 2004/027* (2013.01); *H01M 2220/20* (2013.01); *Y02E 60/122* (2013.01)

(58) Field of Classification Search
USPC ...................................................... 429/231.8
See application file for complete search history.

(56) References Cited

U.S. PATENT DOCUMENTS

| | | |
|---|---|---|
| 2006/0292445 A1 | 12/2006 | Kogetsu et al. |
| 2012/0264020 A1 | 10/2012 | Burton et al. |
| 2013/0011736 A1* | 1/2013 | Loveness ............ H01M 4/0492 |
| | | 429/212 |
| 2014/0027679 A1* | 1/2014 | Kim ..................... H01M 4/485 |
| | | 252/507 |
| 2015/0280221 A1 | 10/2015 | Abdelsalam et al. |

FOREIGN PATENT DOCUMENTS

| | | | |
|---|---|---|---|
| CN | 104919632 A | 9/2015 | |
| EP | 2927997 A1 | 10/2015 | |
| JP | H11339799 A | 12/1999 | |
| JP | 2007005149 A | 1/2007 | |
| KR | 20040044352 A | 5/2004 | |
| KR | 20050084075 A | 8/2005 | |
| KR | 20100121874 A | 11/2010 | |
| KR | 1020140147779 | * 12/2014 | ............ H01M 4/587 |
| KR | 20150086288 A | 7/2015 | |

OTHER PUBLICATIONS

Ho et al. Development of low temperature PECVD nitride with low stress and low etch rate in BOE solution for MEMS applications. 2011 Defense Science and Research Conference and Expo. 2011 Retrieved online from <URL: https://ieeexplore.ieee.org/document/6026873> (Year: 2011).*
Extended European Search Report including Written Opinion for Application No. EP17770672.8 dated Jun. 4, 2018.
Search report from International Application No. PCT/KR2017/003221, dated Jun. 30, 2017.
Chinese Search Report for Application No. 201780002714.8 dated Mar. 31, 2020, 4 pages.

* cited by examiner

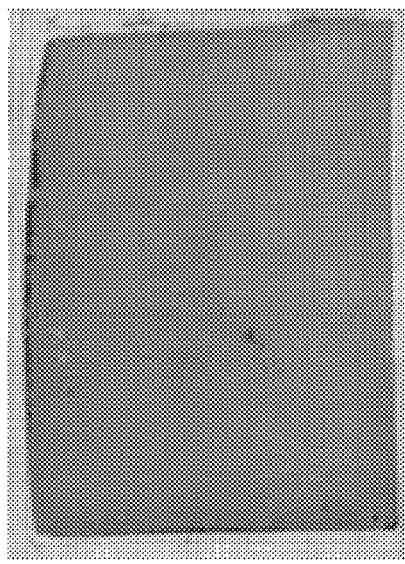 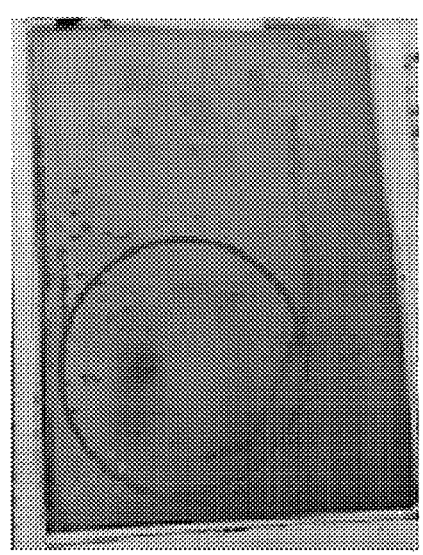
Example 1          Comparative Example 1

NEGATIVE ELECTRODE AND METHOD FOR MANUFACTURING SAME

CROSS-REFERENCE TO RELATED APPLICATIONS

This application is a national phase entry under 35 U.S.C. § 371 of International Application No. PCT/KR2017/003221, filed on Mar. 24, 2017 which claims priority to Korean Patent Application No. 10-2016-0035120, filed on Mar. 24, 2016, the disclosures of which are incorporated herein by reference.

CROSS-REFERENCE TO RELATED APPLICATION

This application claims priority to and the benefit of Korean Patent Application No. 10-2016-0035120, filed on Mar. 24, 2016, the disclosure of which is incorporated herein by reference in its entirety.

TECHNICAL FIELD

The present invention relates to a negative electrode and a method of manufacturing the same.

BACKGROUND ART

With a rapid increase in the use of fossil fuels, there is an increasing demand for use of alternative energy or clean energy. The field of electricity generation and accumulation using an electrochemical reaction has been most actively studied to meet the increasing demand.

As a representative example of electrochemical devices using such electrochemical energy, secondary batteries are currently used and an application area thereof has gradually been increased. Recently, with an increase in development of technology and demand for portable devices, such as portable computers, mobile phones, cameras, and the like, demand for secondary batteries as energy sources is rapidly increasing. Among such secondary batteries, much research on lithium secondary batteries, which have high energy density, high operating voltage, a long cycle lifespan, and a low self-discharge rate, has been conducted, and such lithium secondary batteries are commercially available and widely used.

Generally, a secondary battery consists of a positive electrode, a negative electrode, and an electrolyte. In the secondary battery, lithium ions released from a positive electrode active material are intercalated into a negative electrode active material such as carbon particles through $1^{st}$ charging and the lithium ions are deintercalated through discharging. As lithium ions reciprocate between opposite electrodes as such, they transfer energy. Therefore, the secondary battery can be charged and discharged.

For example, the lithium secondary battery has a structure in which a lithium electrolyte is impregnated into an electrode assembly consisting of a positive electrode including a lithium transition metal oxide as an electrode active material, a negative electrode including a carbon-based active material, and a porous separator. The positive electrode is manufactured by coating an aluminum foil with a positive electrode mixture including a lithium transition metal oxide, and the negative electrode is manufactured by coating a copper foil with a negative electrode mixture including a carbon-based active material.

Meanwhile, lithium is precipitated in a negative electrode including a negative electrode active material such as natural graphite during charging, and thus battery performance may be degraded. Also, when silicon is used as a negative electrode active material, capacity is high, but battery performance may be degraded due to repetition of expansion and contraction caused by charging and discharging.

Therefore, a negative electrode for a secondary battery, which has high capacity and longer lifespan characteristics, is required.

PRIOR-ART DOCUMENT

Patent Document (Patent Document 1) Korean Unexamined Patent Publication No. 10-2010-0121874

DISCLOSURE

Technical Problem

It is an aspect of the present invention to provide a negative electrode having high capacity and a longer lifespan by additionally providing a silicon nitride layer on an active material layer.

It is another aspect of the present invention to provide a secondary battery, a battery module, and a battery pack including the negative electrode.

Technical Solution

In order to accomplish the above objectives, according to an embodiment of the present invention, there is provided a negative electrode which includes a current collector; a first active material layer formed on the current collector; and a second active material layer formed on the first active material layer, wherein the first active material layer includes carbon-based negative electrode active material particles, and the second active material layer includes silicon nitride.

In addition, according to another embodiment of the present invention, there is provided a method of manufacturing the negative electrode, which includes forming a first active material layer on a current collector by using a negative electrode slurry including carbon-based negative electrode active material particles, a conductive material, and a binder (Step 1); and forming a silicon nitride layer on the first active material layer through a plasma-enhanced chemical vapor deposition process (Step 2).

Advantageous Effects

A negative electrode according to the present invention includes a second active material layer including silicon nitride on a first active material layer so that nitrogen in the silicon nitride can react with lithium ions to form lithium nitride. Therefore, in an electrode using a carbon-based negative electrode active material, a problem in that lithium is precipitated on a surface of a negative electrode due to unreacted lithium ions can be resolved by forming the second active material layer.

In addition, the silicon nitride layer contains silicon (Si) nanoparticles so that high capacity can be exhibited, and high output characteristics can also be exhibited due to excellent ionic conductivity while suppressing the swelling of Si nanoparticles due to lithium nitride.

DESCRIPTION OF DRAWINGS

FIG. 1 shows images of results obtained by observing whether or not lithium is precipitated in secondary batteries according to Example 1 and Comparative Example 1 with the naked eye.

BEST MODE

Hereinafter, the present invention will be described in more detail for promoting an understanding of the present invention.

Terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way.

The terminology provided herein is merely used for the purpose of describing particular embodiments, and is not intended to be limiting of the present invention.

The singular forms "a," "an," and "the" are intended to include the plural forms as well, unless the context clearly indicates otherwise.

It should be understood that the terms "comprises," "comprising," "includes," "including," "has," and/or "having," when used herein, specify the presence of stated features, integers, steps, operations, elements, components and/or combinations thereof, but do not preclude the presence or addition of one or more other features, integers, steps, operations, elements, components and/or combinations thereof.

A negative electrode according to an embodiment of the present invention may include a current collector; a first active material layer formed on the current collector; and a second active material layer formed on the first active material layer, wherein the first active material layer may include carbon-based negative electrode active material particles, and the second active material layer may include silicon nitride.

The silicon nitride ($SiN_x$) in the second active material layer may consist of nitrogen and silicon (Si) elements, and some of the nitrogen and Si elements may be covalently bonded to each other. In this case, some of the Si elements which are not covalently bonded with nitrogen elements may be present in the form of Si nanoparticles. Therefore, an active material in the second active material layer may include Si nanoparticles.

The nitrogen elements may actively react with lithium ions in an electrolyte to form lithium nitride ($Li_3N$), and the lithium nitride may surround Si nanoparticles in the second active material layer. Therefore, a problem in that a lithium metal is precipitated on a surface of a negative electrode due to lithium ions which are not occluded in active material particles in an electrode including only a carbon-based active material layer may be resolved. That is, lithium ions, which are not occluded in carbon-based negative electrode active material particles, among lithium ions transferred to the first active material layer may react with nitrogen in the second active material layer to prevent lithium from being precipitated on a surface of a negative electrode.

Further, the silicon nitride in the second active material layer includes Si nanoparticles so that capacity is high, and the Si nanoparticles are surrounded with the lithium nitride so that the lithium nitride serves as a buffer layer, thereby volume expansion caused by the occlusion and release of lithium ions from silicon may be minimized. Also, since the lithium nitride has high ionic conductivity, lithium ions are easily transferred to Si nanoparticles, thereby output characteristics may be improved.

Meanwhile, the current collector is not particularly limited as long as it does not cause a chemical change in a secondary battery and has conductivity. For example, copper, stainless steel, aluminum, nickel, titanium, calcined carbon, aluminum or stainless steel whose surface is treated with carbon, nickel, titanium, silver, or the like may be used as the current collector. Specifically, copper may be used as the current collector, and the current collector may have a thickness of 6 to 25 μm.

The first active material layer is formed on the current collector and may include carbon-based negative electrode active material particles. In the first active material layer, lithium ions released from a positive electrode during charging are intercalated into the negative electrode active material particles, and deintercalated during discharging, thereby current may flow.

As the carbon-based negative electrode active material particles, a carbon material capable of commonly occluding and releasing lithium ions, for example, graphite such as natural graphite, artificial graphite or the like; a carbon-based material such as carbon black, acetylene black, Ketjen black, channel black, furnace black, lamp black, thermal black or the like; a conductive fiber such as carbon fiber, metallic fiber or the like; a conductive tube such as carbon nanotubes or the like; or a fluorocarbon may be used.

Specifically, as the carbon-based negative electrode active material particles, natural graphite, artificial graphite, and a mixed material of natural graphite and artificial graphite may be used. The materials may have a problem in that it is difficult for lithium to uniformly react due to low output characteristics even though high capacity is exhibited when a high level of the active material is loaded.

The first active material layer may further include a conductive material and a binder. In this case, the carbon-based negative electrode active material particles, the conductive material, and the binder may be included in a weight ratio of 93 to 97:1 to 3:2 to 4. When outside the above range, if the proportion of carbon-based negative electrode active material particles is greater than 97, lithium may be precipitated on a surface of a negative electrode, and if less than 93, battery capacity may be degraded.

The second active material layer may include silicon nitride. The silicon nitride may be represented by $SiN_x$, wherein x may satisfy $0.73 \leq x \leq 0.90$. When x is less than 0.73, lithium may be precipitated on a surface of a negative electrode due to an insufficient amount of nitrogen elements capable of reacting with lithium ions, and an effect of mitigating volume expansion caused by silicon may be degraded due to an insufficient amount of lithium nitride serving as a buffer. On the other hand, when x is greater than 0.90, an effect of increasing capacity caused by silicon in the second active material layer may be insignificant.

The composition of silicon nitride in the second active material layer may be measured through X-ray photoelectron spectroscopy (XPS).

The second active material layer may have a thickness of less than 1 μm, particularly, less than 0.5 μm. When the second active material layer has a thickness of greater than 1 μm, a thickness of the second active material layer is significantly changed by charging and discharging Si nanoparticles in the second active material layer, thereby lifespan characteristics may be degraded.

A thickness ratio of the first active material layer and the second active material layer may be 70:1 to 500:1. When the thickness ratio is less than 70:1, a thickness of the second active material layer is significantly changed by charging and discharging Si nanoparticles in the second active material layer, thereby lifespan characteristics may be degraded. On the other hand, when the thickness ratio is greater than 500:1, an amount of nitrogen elements in the second active material layer is not sufficient to combine with unreacted lithium ions, thereby lithium may be precipitated on a surface of a negative electrode.

The second active material layer may contain a Si nanocrystal. The silicon nitride may be represented by $SiN_x$, wherein x may satisfy $0.73 \leq x \leq 0.90$. Si which is not combined with nitrogen may be present in the form of a nanocrystal.

In this case, the $SiN_x$-derived nitrogen, after at least one cycle of charging and discharging, may be combined with lithium ions which are not occluded in the carbon-based negative electrode active material of the first active material layer or the Si nanocrystal of the second active material layer to form lithium nitride ($Li_3N$), and may surround the Si nanocrystal to form first byproduct particles including the Si nanocrystal as a core and the lithium nitride as a shell.

The Si nanocrystal in the first byproduct particles is a negative electrode active material capable of occluding and releasing lithium and may occlude lithium particles to form lithium silicide ($Li_xSi$). Here, x may satisfy $0 < x \leq 3.75$. Consequently, second byproduct particles including the lithium silicide as a core and the lithium nitride as a shell may be formed.

The lithium nitride may serve as a buffer layer with respect to the swelling of the Si nanocrystal, and may rapidly transfer ions into the Si nanocrystal due to high ionic conductivity to help in improving output characteristics.

The Si nanocrystal in the first byproduct particles may have an average diameter ($D_{50}$) of 4 nm to 7 nm, and the lithium silicide in the second byproduct particles may have an average diameter ($D_{50}$) of 5 nm to 10 nm. Also, the lithium nitride shells in the first byproduct particles and second byproduct particles may have a thickness of 8 nm to 15 nm.

The presence and contents of the Si nanocrystal, the lithium silicide, and lithium nitride may be measured through a transmission electron microscope (TEM).

A method of manufacturing the negative electrode according to an embodiment of the present invention may include forming a first active material layer on a current collector by using a negative electrode slurry including carbon-based negative electrode active material particles, a conductive material, and a binder (Step 1); and forming a silicon nitride layer on the first active material layer through a plasma-enhanced chemical vapor deposition process (Step 2).

Hereinafter, the method of manufacturing the negative electrode according to the present invention will be described in detail for each step.

In step 1 of the method of manufacturing the negative electrode according to the present invention, a first active material layer is formed on a current collector by using a negative electrode slurry including carbon-based negative electrode active material particles, a conductive material, and a binder.

Specifically, a slurry prepared by mixing a negative electrode mixture including carbon-based negative electrode active material particles, a conductive material, and a binder with a solvent may be applied on a current collector, dried, and rolled to form the first active material layer.

In this case, the carbon-based negative electrode active material particles, the conductive material, and the binder may be included in a weight ratio of 93 to 97:1 to 3:2 to 4.

As the carbon-based negative electrode active material particles, a carbon material capable of commonly occluding and releasing lithium ions, for example, graphite such as natural graphite, artificial graphite or the like; a carbon-based material such as carbon black, acetylene black, Ketjen black, channel black, furnace black, lamp black, thermal black or the like; a conductive fiber such as carbon fiber, metallic fiber or the like; a conductive tube such as carbon nanotubes or the like; or a fluorocarbon may be used. As the binder, any of various types of binder polymers such as a polyvinylidene fluoride-hexafluoropropylene copolymer (PVDF-co-HFP), polyvinylidene fluoride, polyacrylonitrile, polymethyl methacrylate, polyvinyl alcohol, carboxymethyl cellulose (CMC), starches, hydroxypropyl cellulose, regenerated cellulose, polyvinyl pyrrolidone, tetrafluoroethylene, polyethylene, polypropylene, an ethylene-propylene-diene monomer (EPDM), a sulfonated EPDM, styrene-butadiene rubber (SBR), fluororubber, polyacrylic acid, a polymer in which hydrogen atoms of the above polymers are substituted with Li, Na, Ca or the like, various copolymers, and the like may be used.

The solvent may be an organic or aqueous solvent generally used in the art, and one or a mixture of two or more of dimethylformamide (DMF), dimethyl sulfoxide (DMSO), isopropyl alcohol, N-methylpyrrolidone (NMP), acetone, water, and the like may be used as the solvent.

In step 2 of the method of manufacturing the negative electrode according to the present invention, a silicon nitride layer is formed on the first active material layer through a plasma-enhanced chemical vapor deposition process.

Specifically, in step 2, nitrogen gas diluted with silane gas is used as a raw material to form a silicon nitride layer.

In this case, a flow rate of the nitrogen gas diluted with silane gas may be 30 sccm to 70 sccm, particularly 50 sccm, a molar ratio of the nitrogen gas and silane gas may be 97:3 to 99:1, particularly 98:2, and conditions for the plasma-enhanced chemical vapor deposition process may be set at a plasma power of 25 watts to 100 watts, a deposition time of 0.5 hour to 2 hours, and a temperature of 100° C. to 300° C. When the plasma-enhanced chemical vapor deposition process is performed under the above conditions, a silicon nitride ($SiN_x$ ($0.73 \leq x \leq 0.90$)) thin film with a thickness of less than 1 μm may be prepared.

A secondary battery according to an embodiment of the present invention may include the negative electrode, a positive electrode, a separator interposed between the negative electrode and the positive electrode, and an electrolyte.

The secondary battery includes the negative electrode including the silicon nitride thin film, and thus may exhibit high capacity and longer lifespan characteristics.

The positive electrode may be manufactured by applying a slurry prepared by mixing a positive electrode mixture including positive electrode active material particles, a conductive material, and a binder with an organic solvent on a positive electrode current collector, followed by drying and rolling.

The positive electrode active material is not particularly limited, but, particularly, a lithium transition metal oxide may be used. As the lithium transition metal oxide, for example, one or a mixture of two or more of a Li•Co-based composite oxide such as LiCoO$_2$ or the like, a Li•Ni•Co•Mn-based composite oxide such as LiNi$_x$Co$_y$Mn$_z$O$_2$ or the like, a Li•Ni-based composite oxide such as LiNiO$_2$ or the like, and a Li•Mn-based composite oxide such as LiMn$_2$O$_4$ or the like may be used.

As the separator, a common porous polymer film conventionally used as a separator, for example, a porous polymer film made of a polyolefin-based polymer such as an ethylene homopolymer, a propylene homopolymer, an ethylene/butene copolymer, an ethylene/hexene copolymer, an ethylene/methacrylate copolymer or the like, or a stacked structure having two or more layers made thereof may be used. Alternatively, a common porous non-woven fabric, for example, a non-woven fabric made of high-melting point glass fiber, polyethylene terephthalate fiber or the like may be used, but the present invention is not limited thereto.

The electrolyte may include a non-aqueous organic solvent and a metal salt.

As the non-aqueous organic solvent, for example, an aprotic organic solvent such as N-methyl-2-pyrrolidinone, propylene carbonate, ethylene carbonate, butylene carbonate, dimethyl carbonate, diethyl carbonate, y-butyrolactone, 1,2-dimethoxyethane, tetrahydroxy Franc, 2-methyltetrahydrofuran, dimethyl sulfoxide, 1,3-dioxolane, formamide, dimethylformamide, dioxolane, acetonitrile, nitromethane, methyl formate, methyl acetate, a phosphoric acid triester, trimethoxymethane, a dioxolane derivative, sulfolane, methylsulfolane, 1,3-dimethyl-2-imidazolidinone, a propylene carbonate derivative, a tetrahydrofuran derivative, an ether, methyl propionate, ethyl propionate, or the like may be used.

As the metal salt, a lithium salt may be used. As the lithium salt, a material readily soluble in the non-aqueous electrolyte, for example, LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chloroborane lithium, lower aliphatic carboxylic acid lithium, lithium tetraphenylborate, an imide or the like may be used.

According to another embodiment of the present invention, there are provided a battery module including the secondary battery as a unit cell and a battery pack including the same. The battery module and the battery pack include the secondary battery having high capacity and longer lifespan characteristics, and thus may be used as a power source for medium- to large-sized devices selected from the group consisting of an electric vehicle, a hybrid electric vehicle, a plug-in hybrid electric vehicle, and a power storage system.

[Mode for Invention]

Hereinafter, exemplary embodiments of the present invention will be described in detail so that those of ordinary skill in the art can carry out the present invention. However, it should be understood that the present invention can be implemented in various forms, and is not intended to limit the exemplary embodiments of the present invention.

EXAMPLE 1

Step 1: Formation of First Active Material Layer

Natural graphite as a negative electrode active material, styrene-butadiene rubber (SBR) as a binder, carbon black as a conductive material were added at 96 wt %, 3 wt %, and 1 wt %, respectively, to distilled water as a solvent to prepare a negative electrode slurry. The negative electrode slurry was applied on a copper (Cu) thin film with a thickness of 20 μm, which is a negative electrode current collector, dried to manufacture a negative electrode, and then roll-pressed to form a first active material layer with a thickness of 80 μm on a current collector.

Step 2: Formation of Second Active Material Layer

The current collector on which the first active material layer is formed was placed in a reaction chamber.

In the reaction chamber, nitrogen gas diluted with silane gas (a molar ratio of N$_2$:SiH$_4$=98:2) was introduced at a flow rate of 50 sccm while a power of 25 watts was applied to form plasma, and reacted at 100° C. for 30 minutes to form a silicon nitride layer with a thickness of 0.5 μm (thickness of first active material layer:thickness of second active material layer=160:1) on the first active material layer, thereby a negative electrode was manufactured. In this case, a composition of the silicon nitride measured through X-ray photoelectron spectroscopy (XPS) was SiNx (x=0.73).

Step 3: Manufacture of Positive Electrode and Secondary Battery 96 wt % of a lithium cobalt composite oxide as a positive electrode active material, 2 wt % of carbon black as a conductive material, and 2 wt % of polyvinylidene fluoride (PVDF) as a binder were added to N-methyl-2-pyrrolidone (NMP) to prepare a positive electrode slurry. The positive electrode slurry was applied on an aluminum (Al) thin film with a thickness of 20 μm, which is a positive electrode current collector, dried, and roll-pressed to manufacture a positive electrode.

The negative electrode manufactured in step 2, the positive electrode, and a porous polyethylene separator were assembled using a stacking method, and an electrolyte (ethylene carbonate (EC)/ethyl methyl carbonate (EMC) =3/7 (volume ratio)) and lithium hexafluorophosphate (1M LiPF$_6$) were injected into the battery thus assembled to manufacture a lithium secondary battery.

COMPARATIVE EXAMPLE 1

Manufacture of Negative Electrode Including Only Carbon-Based Active Material

Natural graphite as a negative electrode active material, styrene-butadiene rubber (SBR) as a binder, carbon black as a conductive material were added at 96 wt %, 3 wt %, and 1 wt %, respectively, to distilled water as a solvent to prepare a negative electrode slurry. The negative electrode slurry was applied on a copper (Cu) thin film with a thickness of 20 μm, which is a negative electrode current collector, dried to manufacture a negative electrode, and then roll-pressed to form a first active material layer with a thickness of 80.5 μm on a current collector, thereby a negative electrode was manufactured.

A secondary battery was manufactured in the same manner as in step 3 of Example 1.

EXPERIMENTAL EXAMPLE 1

Observation of Lifespan Characteristics

In order to evaluate lifespan characteristics of the secondary batteries according to Example 1 and Comparative Example 1, an experiment was performed as follows.

Each lithium secondary battery was charged and discharged at 0.1 C in a first cycle and at 1 C in subsequent cycles. A ratio of discharge capacity after a 49$^{th}$ cycle to initial discharge capacity was measured, the result of which is shown in Table 1.

TABLE 1

| | Initial discharge capacity (mAh/g) | Lifespan characteristics (%) |
|---|---|---|
| Example 1 | 351 | 98 |
| Comparative Example 1 | 340 | 95 |

Lifespan characteristic: (discharge capacity after $49^{th}$ cycle/initial discharge capacity) × 100

EXPERIMENTAL EXAMPLE 2

Observation of Lithium Precipitation

In order to identify whether or not lithium is precipitated in the secondary batteries according to Example 1 and Comparative Example 1, each secondary battery was subjected to ten cycles of charging and discharging at 1.5C, and the secondary battery was then decomposed under a dry atmosphere. Then, a surface of a separator in a direction of a negative electrode surface was observed with the naked eye to identify whether or not lithium is precipitated, the result of which is shown in FIG. 1.

As shown in FIG. 1, it can be confirmed that a dark brown precipitate was observed on a surface of a separator according to Comparative Example 1, but no precipitate was observed on a surface of a separator according to Example 1.

From this result, it can be seen that Example 1, in which a negative electrode consisted of a current collector, a first active material layer, and a second active material layer which included silicon nitride, exhibited an effect of preventing lithium from being precipitated on a surface of a negative electrode by forming lithium nitride through a reaction of a nitride and a lithium ion.

While exemplary embodiments have been described above in detail, the scope of the present invention is not limited thereto, but encompasses several modifications and improvements by those skilled in the art using basic concepts of embodiments of the present invention defined by the appended claims.

The invention claimed is:

1. A negative electrode comprising:
a current collector;
a first active material layer formed on the current collector; and
a second active material layer formed on the first active material layer,
wherein the first active material layer includes carbon-based negative electrode active material particles, and the second active material layer includes silicon nitride,
wherein the silicon nitride is represented by $SiN_x$ where x satisfies $0.73 < x < 0.90$ and a portion of silicon which is not covalently bonded to nitrogen is present in the form of a silicon (Si) nanocrystal.

2. The negative electrode of claim 1, wherein the second active material layer has a thickness of less than 1 μm.

3. The negative electrode of claim 1, wherein a thickness ratio of the first active material layer and the second active material layer is 70:1 to 500:1.

4. The negative electrode of claim 1, wherein the second active material layer includes first byproduct particles including a Si nanocrystal core and a lithium nitride ($Li_3N$) shell surrounding the Si nanocrystal core after at least one cycle of charging and discharging.

5. The negative electrode of claim 1, wherein the second active material layer includes second byproduct particles including a lithium silicide core and a lithium nitride ($Li_3N$) shell surrounding the lithium silicide core after at least one cycle of charging and discharging.

6. The negative electrode of claim 5, wherein the lithium silicide is represented by $Li_xSi$ where x satisfies $0 < x < 3.75$.

7. The negative electrode of claim 1, wherein the carbon-based negative electrode active material particles of the first active material layer is natural graphite.

8. The negative electrode of claim 1, wherein the first active material layer further includes a conductive material and a binder.

9. A method of manufacturing the negative electrode of claim 1, comprising:
forming the first active material layer on the current collector by using a negative electrode slurry including the carbon-based negative electrode active material particles, a conductive material, and a binder (Step 1); and
forming the silicon nitride layer on the first active material layer through a plasma-enhanced chemical vapor deposition process (Step 2).

10. The method of claim 9, wherein, in the plasma-enhanced chemical vapor deposition process in step 2, nitrogen gas diluted with silane gas is used as a raw material, a flow rate of nitrogen gas diluted with silane gas is 30 sccm to 70 sccm, and a molar ratio of the nitrogen gas and silane gas is 97:3 to 99:1.

11. The method of claim 9, wherein the plasma-enhanced chemical vapor deposition process in step 2 is performed at a plasma power of 25 watts to 100 watts and a deposition time of 0.5 hour to 2 hours.

12. The method of claim 9, wherein the plasma-enhanced chemical vapor deposition process in step 2 is performed at a temperature of 100° C. to 300° C.

13. A secondary battery comprising the negative electrode of claim 1, a positive electrode, a separator interposed between the negative electrode and the positive electrode, and an electrolyte.

14. A battery module comprising the secondary battery of claim 13 as a unit cell.

15. A battery pack comprising the battery module of claim 14 and used as a power source for medium- to large-sized devices.

16. The battery pack of claim 15, wherein the medium- to large-sized device is selected from the group consisting of an electric vehicle, a hybrid electric vehicle, a plug-in hybrid electric vehicle, and a power storage system.

* * * * *